(No Model.)
J. B. NORTON.
BELT HOOK.
No. 591,681.  Patented Oct. 12, 1897.
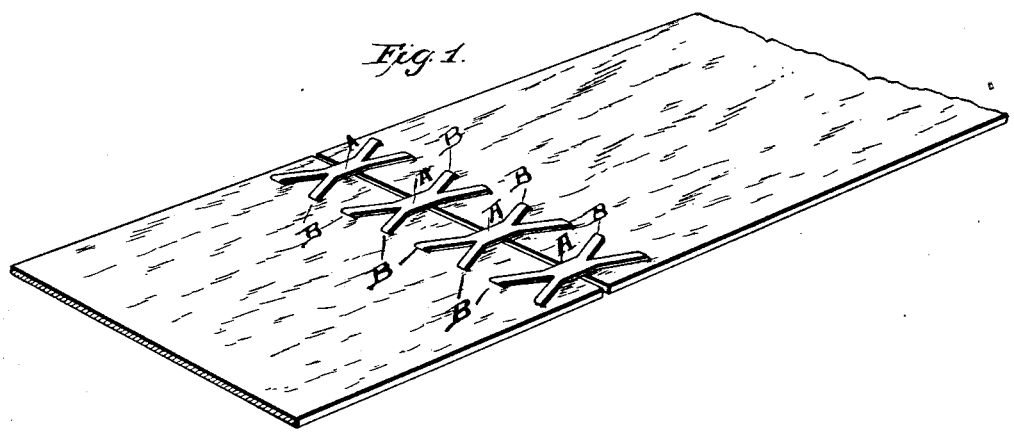
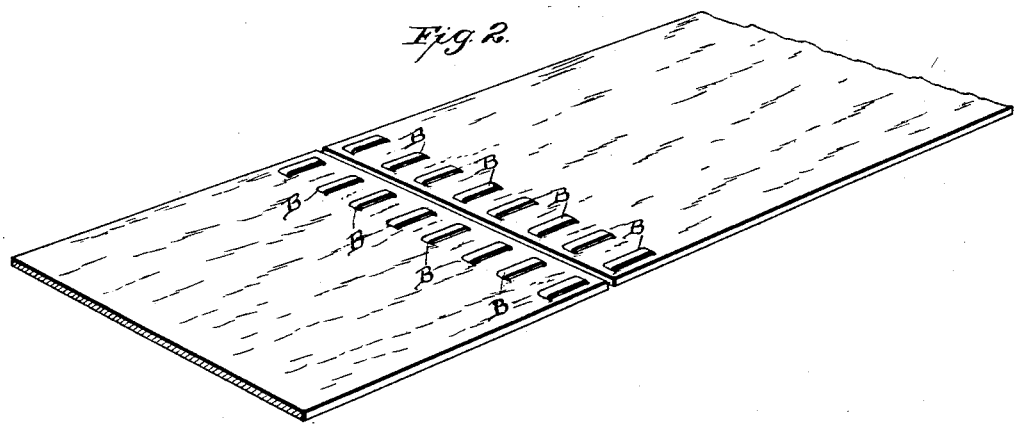
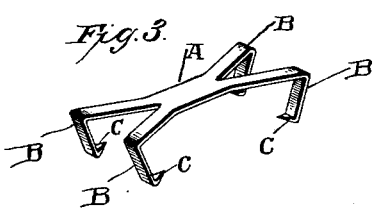
Witnesses
E. C. Wurdeman
A. S. Williamson
Inventor
John B. Norton
by Geo. H. Holgate
Attorney
THE NORRIS PETERS CO., PHOTO-LITHO., WASHINGTON, D. C.

UNITED STATES PATENT OFFICE.

JOHN B. NORTON, OF MADISON, WISCONSIN.

BELT-HOOK.

SPECIFICATION forming part of Letters Patent No. 591,681, dated October 12, 1897.

Application filed May 1, 1896. Serial No. 589,822. (No model.)

*To all whom it may concern:*

Be it known that I, JOHN B. NORTON, a citizen of the United States, residing at Madison, in the county of Dane and State of Wisconsin, have invented certain new and useful Improvements in Belt-Hooks, of which the following is a specification.

My invention relates to a new and useful improvement in hooks for securing together the meeting ends of belts, and has for its object to provide a hook of this description which shall be simple in construction, easy of application, and when secured in place present no protruding points by means of which surrounding objects may become entangled or injured.

It is a well-known fact that when the meeting ends of belts are secured together by the ordinary hooks the ends of these hooks where they are bent parallel with the leather of which the belt is composed are liable to come in contact with surrounding objects and cause much damage, and this is especially the case in connection with belts that are to be shifted by hand, such as those running upon cone-pulleys, as when the hand is applied to such a belt the projecting ends of the hooks are liable to seriously injure the person. These disadvantages I have entirely overcome by forming what I term a "safety-hook," the construction of which will be hereinafter set forth in connection with the accompanying drawings, which form a part of this specification, in which—

Figure 1 is a perspective of the two meeting ends of a belt secured together by my improved hooks, the clenching ends of said hooks being upward; Fig. 2, a similar view showing the backs of the hooks upward. Fig. 3 is an enlarged view of the fastener.

In carrying out my invention I take a piece of sheet metal and stamp or cut therefrom a hook having an oblong body A and diverging arms B, projecting from each corner of the body. These arms are preferably bent downward at about midway their length, so that they stand at an acute angle to the plane of the body. The ends of the arms are bent upward and pointed, as at C, in order that they will readily enter the material of which the belt is composed.

A hook thus formed is applied to the meeting ends of a belt by first forming suitable holes through said belt and passing the legs B therethrough, then bringing pressure to bear from above, which will bend the legs against the leather and clench the points, causing them to lie beside the body portion A.

The advantages gained by the use of a hook of this construction are, first, no points project to catch in surrounding objects; second, the points C, being driven into a belt, tend to increase the resistance of the legs against lengthwise strain, thereby preventing them from being opened as readily as would be the case were no points used; third, the hooks, if applied properly, will lie flush with the surface of the belt, so that the hooks will ride over the pulleys with little or no concussion.

What I claim as new and useful is—

A belt-hook formed of a piece of sheet metal, said hook having an oblong body, diverging arms projecting from each corner of the body, said arms being bent downward at approximately midway their length at such an angle that they will clench when pressure is brought to bear from above, the ends of the arms being bent upward and pointed, said pointed ends being adapted to lie beside the body portion when clenched, as and for the purpose described.

In testimony whereof I have hereunto affixed my signature in the presence of two subscribing witnesses.

JOHN B. NORTON.

Witnesses:
S. S. WILLIAMSON,
ROBERT WOOTTON.